UNITED STATES PATENT OFFICE.

WILLIAM PARKINSON, OF PHILADELPHIA, PENNSYLVANIA.

METHOD OF CONVERTING CAST-STEEL INTO WROUGHT-IRON.

SPECIFICATION forming part of Letters Patent No. 511,648, dated December 26, 1893.

Application filed February 1, 1893. Serial No. 460,578. (No specimens.)

*To all whom it may concern:*

Be it known that I, WILLIAM PARKINSON, a citizen of the United States, residing at Philadelphia, in the county of Philadelphia and State of Pennsylvania, have invented certain new and useful Improvements for Converting Steel into Wrought-Iron, of which the following is a specification, reference being had therein to the accompanying drawings.

My invention is a method of converting cast steel into wrought iron and it consists in certain novel features hereinafter described and claimed.

In carrying out my improved process I first mix about one hundred pounds of finished rolling mill scale and about twenty pounds of charcoal, which is as free as possible from sulphur, with a small quantity of water, and place the mixture against the boshes of the puddling furnace where it remains until reduced to a spongy mass. The cast steel is prepared in the usual way by running molten cast iron into a Bessemer converter where I blow out all the carbon. I then recarbonize the steel to a very low degree, about one-fifth of one per cent. or less, the lower the better, and then run the molten steel from the converter into a tank of water thus disintegrating it into a number of minute particles like shot. When the spongy mass on the boshes of the puddling furnace has reached the proper state, I take the shot-like particles just mentioned and charge about four-hundred- weight of the same in the said mass. The furnace is then fired so that the entire mass is heated and when it has been raised to the proper temperature I put a rabble into the furnace and pull the spongy mass from the chills so that the entire quantity will be acted upon and the ingredients thoroughly commingled. The heat and the oxygen from the flame act on the mass so as to convert it into wrought iron and it is prepared for the market or for use by being passed under the hammer or through rolls in the usual manner. By the process just described, I produce a superior quality of iron in less time and at less expense than by any process now in common use.

Having thus described my invention, what I claim, and desire to secure by Letters Patent, is—

The method of converting cast steel into wrought iron which consists in first forming a mixture of charcoal and rolling mill scale, then reducing the mixture to a spongy mass, then commingling with the spongy mass shot-like particles of low steel, and finally subjecting the mixture to the action of heat in the puddling furnace.

In testimony whereof I affix my signature in the presence of two witnesses.

WILLIAM PARKINSON.

Witnesses:
    CHAS. S. NELSON,
    JAMES JEFFERYS.